United States Patent
McClearen et al.

(10) Patent No.: US 8,470,083 B2
(45) Date of Patent: Jun. 25, 2013

(54) PORTABLE CANISTER VACUUM

(75) Inventors: Victor McClearen, Cookeville, TN (US); Ernest Matthew Chavana, Jr., Cookeville, TN (US)

(73) Assignee: Oreck Holdings, LLC, Cheyenne, WY (US)

(*) Notice: Subject to any disclaimer, the term of this patent is extended or adjusted under 35 U.S.C. 154(b) by 67 days.

(21) Appl. No.: 13/011,500

(22) Filed: Jan. 21, 2011

(65) Prior Publication Data

US 2011/0214567 A1    Sep. 8, 2011

Related U.S. Application Data

(60) Provisional application No. 61/311,701, filed on Mar. 8, 2010.

(51) Int. Cl.
*B01D 46/00*     (2006.01)

(52) U.S. Cl.
USPC .............. 95/273; 55/373; 55/428; 55/467; 55/DIG. 3; 55/372; 96/382; 15/347; 15/352

(58) Field of Classification Search
USPC ............ 55/467, 337, 428, 429, 472, 473, 55/DIG. 3, 309, 345, 459.1; 15/347, 352, 15/353; 95/268, 273, 287; 96/415
See application file for complete search history.

(56) References Cited

U.S. PATENT DOCUMENTS

| | | | |
|---|---|---|---|
| 6,148,474 A | 11/2000 | Ohara | |
| 6,896,719 B2* | 5/2005 | Coates et al. | 95/268 |
| 7,267,704 B2* | 9/2007 | Allgeier | 55/429 |
| 7,275,281 B2* | 10/2007 | Park | 15/347 |
| 7,318,848 B2* | 1/2008 | Lee | 55/283 |
| 7,501,002 B2* | 3/2009 | Han et al. | 55/309 |
| 7,507,980 B2 | 3/2009 | Garcia | |
| 7,544,226 B2* | 6/2009 | Oh | 55/410 |
| 7,615,090 B2* | 11/2009 | Archambault et al. | 55/467 |
| 7,922,794 B2* | 4/2011 | Morphey | 95/271 |
| 8,051,532 B1* | 11/2011 | Griffith et al. | 15/353 |

FOREIGN PATENT DOCUMENTS

EP   1 731 073 A3   12/2006
GB   2 181 042 A    4/1987

* cited by examiner

*Primary Examiner* — Duane Smith
*Assistant Examiner* — Minh-Chau Pham

(57) ABSTRACT

A portable handheld canister vacuum including an upper, central, and lower housing is disclosed. First and second grills can separate the housing sections. An air intake opening can direct air and dirt in a first axial direction to a dirt capturing device in the lower housing. An air propulsion device directs air in a second axial direction opposite to the first axial direction into the central housing and from there into the upper housing. An exhaust opening disposed through the upper housing and leading to the interior region of the upper housing allows air to exit the interior region of the upper housing. The exhaust can exit the upper housing in a direction substantially perpendicular to the first and second axial directions.

19 Claims, 10 Drawing Sheets

US 8,470,083 B2

PORTABLE CANISTER VACUUM

CROSS REFERENCE

This application claims the benefit of U.S. Provisional Patent Application No. 61/311,701, filed on Mar. 8, 2010 which is referred herein its entirety by reference.

Applicants also incorporate by reference in its entirety the co-filed application entitled "HANDHELD VACUUM ATTACHMENT WITH ULTRAVIOLET LIGHT," 13/011,469.

TECHNICAL FIELD

The present invention relates to cleaning devices, and more particularly, to powerful and compact vacuum devices including noise and vibration dampeners.

BACKGROUND

Canister vacuums are well-known in the art and typically include an air flow path in a single direction. For example, U.S. Pat. No. 6,148,474, incorporated fully herein in its entirety by reference, discloses a well-known canister vacuum 10 that has air intake 16 disposed at the front of the canister and an air exhaust 18 disposed at the back of the canister. The canister includes motor 20 and fan 22 disposed in a linear fashion between air intake 16 and air exhaust 18 such that air flows through the canister in a single direction inside the canister. Canister vacuums having such an airflow do not make efficient use of all available space within the canister and thus can be large, heavy, and cumbersome. Such vacuums can also be inefficient and noisy due to vibrations and loss of air through unsealed areas.

SUMMARY

The present invention is directed to a compact, high-powered, portable, handheld canister vacuum including upper, lower, and central sections that include components configured to create air flow paths directed in opposite axial directions.

A compact, high-powered, portable, handheld canister vacuum that makes efficient use of available space within the canister is described. An air intake conduit 280 directs intake air in a first axial direction and an air propulsion device 110 that directs cleaned air in second axial direction opposite to the first direction. The cleaned air can also be redirected to the first axial direction prior to being expelled from the vacuum canister via exhaust 235.

It is a further object of the present invention to provide a sealed canister vacuum 100 that allows air to enter the vacuum only via the air intake opening 280 and exit the vacuum only via the air exhaust 235.

It is a further object of the invention to provide a compact, high-powered canister vacuum 100 that provides vibration and noise dampeners to reduce vibration and noise.

It is another object of the invention to provide a compact, high-powered portable handheld vacuum 100 that provides at least 180 inches of field suction and includes a total canister volume of less than 675 cubic inches, and optionally wherein the vacuum includes a lower housing of less than 270 cubic inches, a central housing of less than 225 cubic inches, and an upper housing of less than 225 inches.

BRIEF DESCRIPTION OF THE DRAWINGS

The same reference number represents the same element on all drawings. It should be noted that the drawings are not necessarily to scale. The foregoing and other objects, aspects, and advantages are better understood from the following detailed description of a preferred embodiment with reference to the drawings, in which.

DETAILED DESCRIPTION

The present invention is generally directed to a compact, high-powered, portable, handheld vacuum. The components within the vacuum can be configured to maximize efficient use of the limited internal space. To minimize the vacuum size the vacuum can create air flow that can be directed in opposite axial directions. For example, an air flow path that intakes air in a first axial direction and exhausts clean air in a second axial direction opposite to the first axial direction is described herein.

Figure 1:
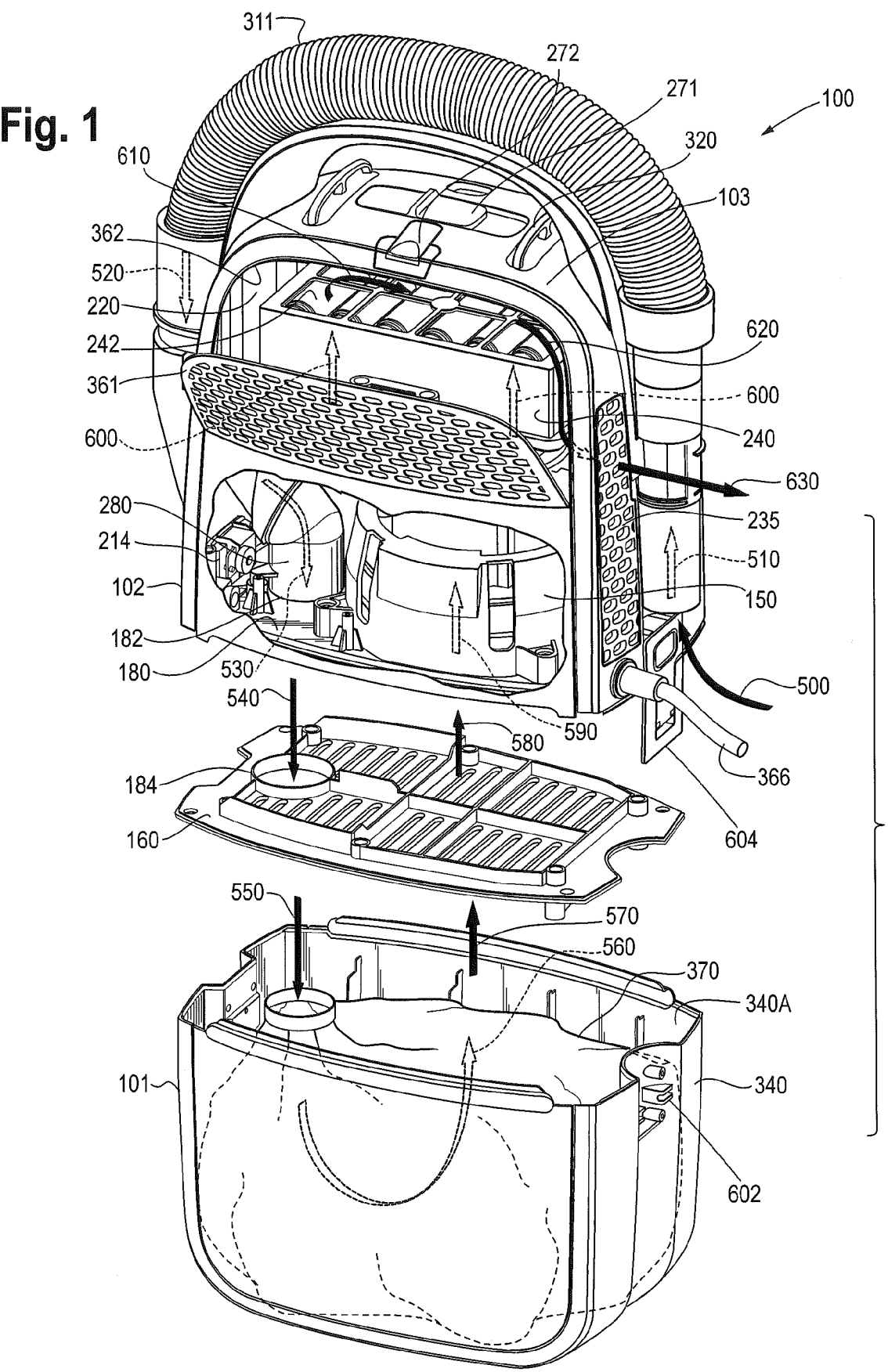
FIG. 1 is a partially exploded front profile view of a canister vacuum in accordance with an embodiment.

FIG. 1 shows a front profile view of a canister vacuum 100 in accordance with an embodiment of the invention. Vacuum 100 can include sealed upper 103, central 102, and lower 101 sections.

Upper section 103 includes upper housing 220. Upper housing 220 includes interior region 220A. A compartment 240 including filter media 242 can be disposed in interior region 220A. In some embodiments, interior region 220A of upper housing 220 can store a battery. The battery can be used for a DC version of vacuum 100. Upper housing 220 also includes exhaust openings 222 (see FIG. 4) to exhaust a clean air flow 610, 620. Exhaust openings 222 can be disposed on a sidewall of upper housing 220. Exhaust openings 222 can be oriented to a sidewall of vacuum 100. Upper housing includes a door 361 secured by latch 272. Door 361 can be opened to access filter media 242 and/or a battery.

Central section 102 includes central housing 210 providing an interior region 210A. An air propulsion device 110 (see FIG. 2) can be disposed in interior region 210A. A circuit board 214 comprising a heat sink 200 can be disposed in interior region 210A. Airflow generated by air propulsion device 110 can cool circuit board 214 by absorbing heat from heat sink 200. Air propulsion device 110 can be encased in foam (not shown) to dampen sound. The foam can be enclosed by a bell housing 150 to dampen sound. Air propulsion device 110 can be secured in housing using a rubber boot 120, one or more shock mounts 130, and a bushing 140, all of which can be made of rubber and act to secure the air propulsion device and dampen vibration and noise. Rubber boot 120 can provide an opening 122 for air to be drawn in by air propulsion device 110. The bushing 140 can be received by a bushing ring 140A. Bushing ring 140A can be disposed in grill 211, which separates upper housing 220 from central housing 210. Grill 211 can form a top wall of upper housing 220. Grill 211, bushing 140, rubber boot 120 and inner wall 180 can work together firmly secure air propulsion device 110 in central housing 210.

Lower section 101 includes lower housing 340 that provides an interior region 340A. Lower housing 340 can be adapted to receive fascia panels 350, 351 to effect a quick change in the vacuum outward appearance. For example, tab 374 can be received in slot 372 to secure a fascia to lower housing 340. Lower housing 240 can include non-skid pads 376 for vacuum 100 to be placed on in a normally operating position. A vacuum cleaner bag dirt capturing device 370 can be disposed in the lower housing 340 along with vacuum cleaner bag mounting brackets 360, 361.

Figure 6:
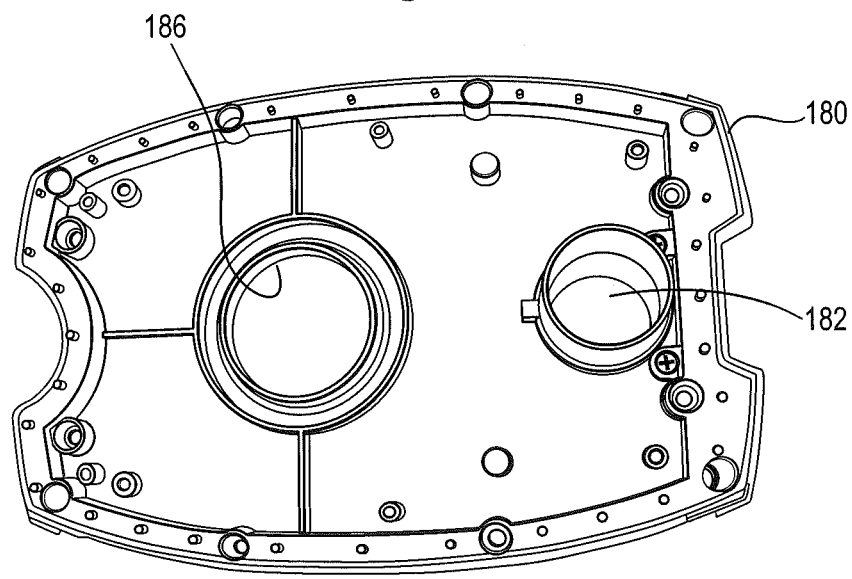
FIG. 6 illustrates an inner wall disposed between the central housing and a lower housing.
Figure 7A:
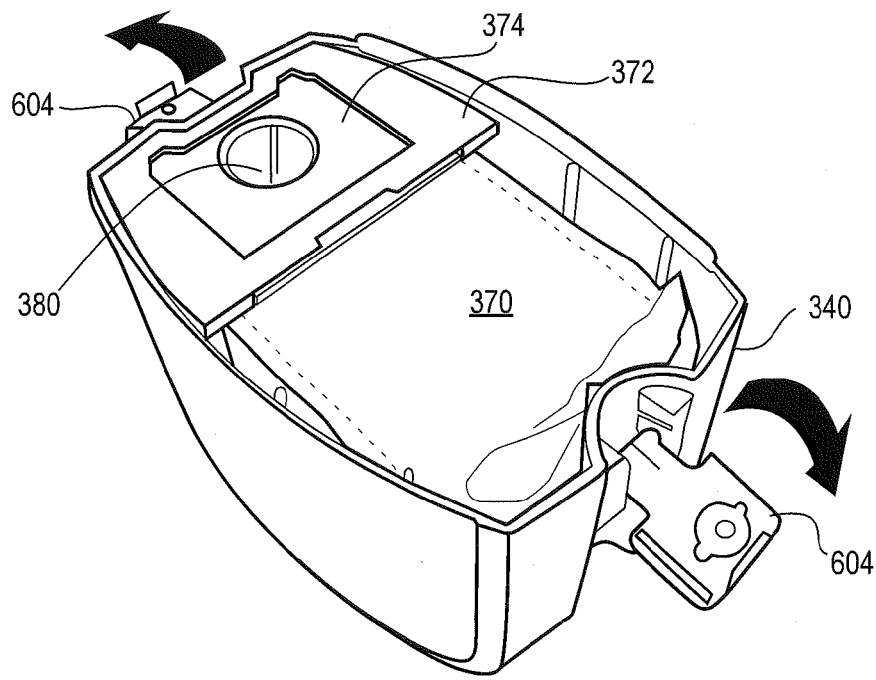
FIGS. 7A-7D illustrate a method of removing and sealing a vacuum bag.
Figure 7B:
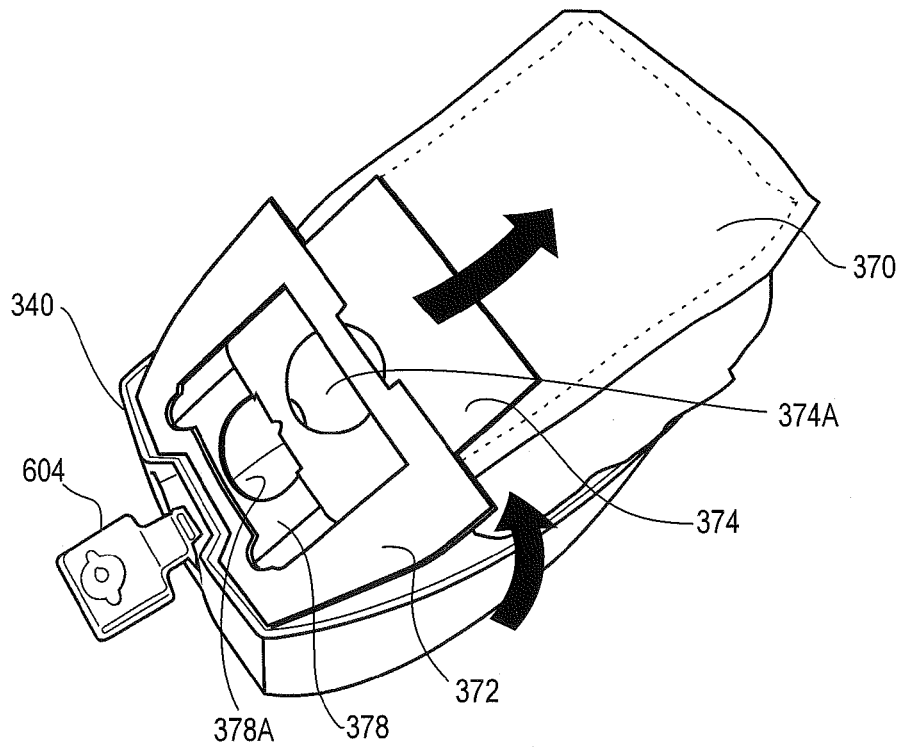
Figure 7C:
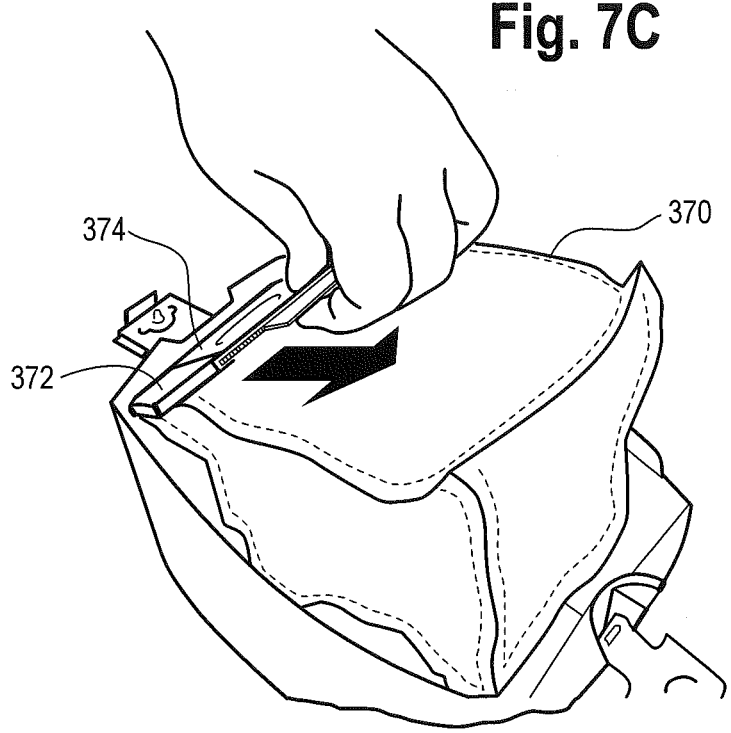
Figure 7D:
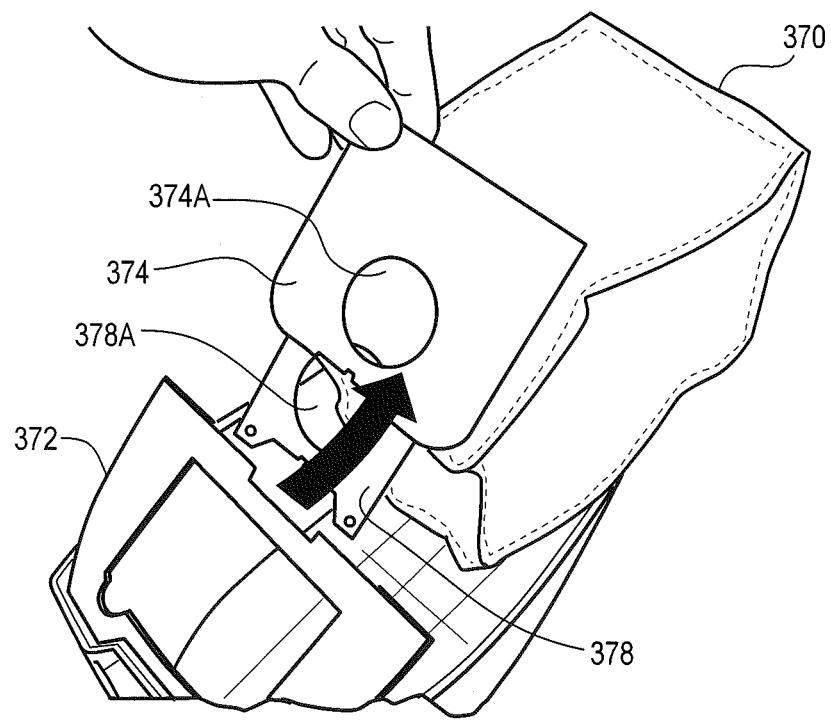
Figure 8:
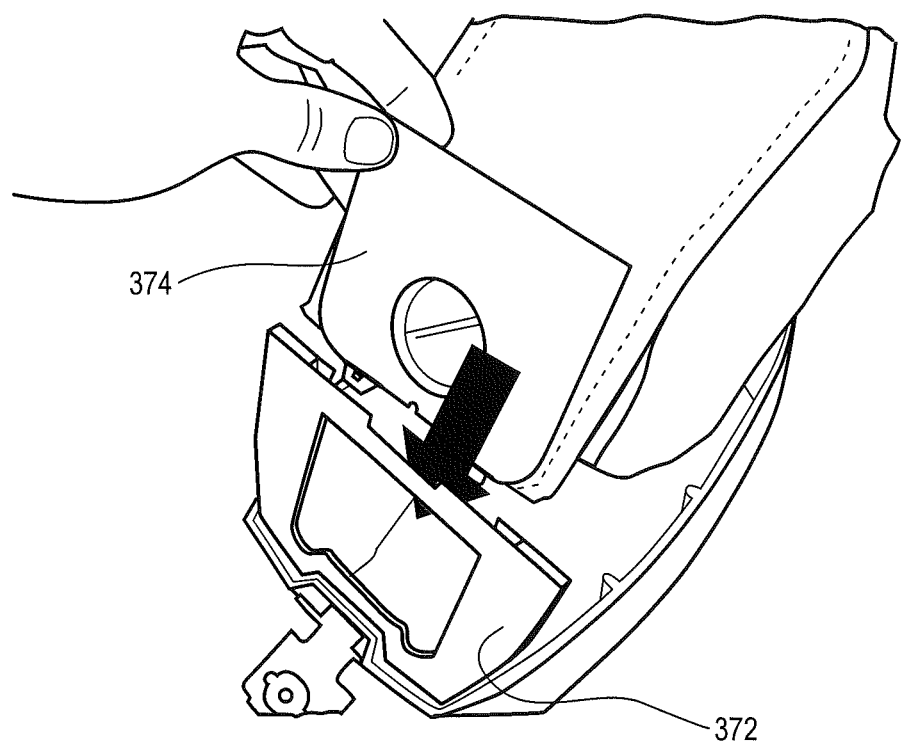
FIG. 8 illustrates a method of inserting a vacuum bag.

Lower housing 340 and central housing 210 are separated by inner wall 180. Optionally, grill 160 can be disposed against inner wall 180. An opening 182 in inner wall 180 complements opening 184 in grill 160. In some embodiments, rubbers gaskets 170, 190 can be used to seal lower section 101 with central section 102. Two or more latches 600 can be used to secure lower section 101 with central section 102. Rubber gaskets 170, 190 seal the lower and central housings and also dampen noise and vibration. Latches 600 can mate with fastening means 602 disposed in the lower section 101. Inner wall 180 includes an opening 186 (see FIG. 6) from which air is drawn by air propulsion device 110 into central housing 210. Opening 186 receives opening 122 of rubber boot 120.

An air intake duct comprising duct portions 310, 300, 290 and 280 (see FIG. 2) can couple to opening 182 (see FIG. 6) and opening 184. A hose 311 can be coupled in duct portion 310.

Vacuum 100 can further include with an air intake port 310, air exhaust 235, air propulsion device 110, 370 (e.g., vacuum bag), and optional filter 242 disposed in upper 103, central 102, and lower 101 sections. Vacuum 100 depicts an air flow pathway wherein intake air enters hose 311 following airflow path 510 and 520. The intake air travels through conduit portions 310, 300, 290, 280 (FIG. 2) and enters the central section 102 along flow path 530. The intake air then travels through an opening in grill 180 and into vacuum bag 370 located in lower housing 101 in a first axial direction along flow paths 540, 550. First axial direction corresponds to the direction of airflow 550.

Dirt particles can be retained in vacuum bag 370. The bag can trap 70%, 80%, 90% of particulates that pass through it as they are carried by airflow 550, 560. The airflow is redirected from the lower housing 101 back up through grill 180 in a second axial direction opposite to the first axial direction along air flow paths 570, 580, 590. The airflow is moved from the lower housing to the central housing by air propulsion device 110 in the second axial direction along air flow path 570, 580, 590. Airflow path 570, 580, 590 can flow through a motor. This can advantageously cool the motor. Airflow 590 can swirl around various portions of central housing 210. Various components disposed in housing 210, e.g., a circuit board, can thus be cooled. Airflow 590 is then directed towards upper housing 103 along air flow path 600. Upper housing 103 can contain compartment/filter frame 240, which can optionally include filter media 242, such as a HEPA filter. In some embodiments, a battery pack can be disposed in upper housing. A battery can be used make a cordless vacuum 100.

After the cleaned air exits compartment 240, optionally by traveling through filter 242, the air is directed sideways along air flow path 610 exiting upper housing and then downward along air flow path 620, a portion of which is in the first axial direction, before exiting the vacuum through exhaust opening 222 along air flow path 620, which is perpendicular to the first and second axial directions.

Figure 2:
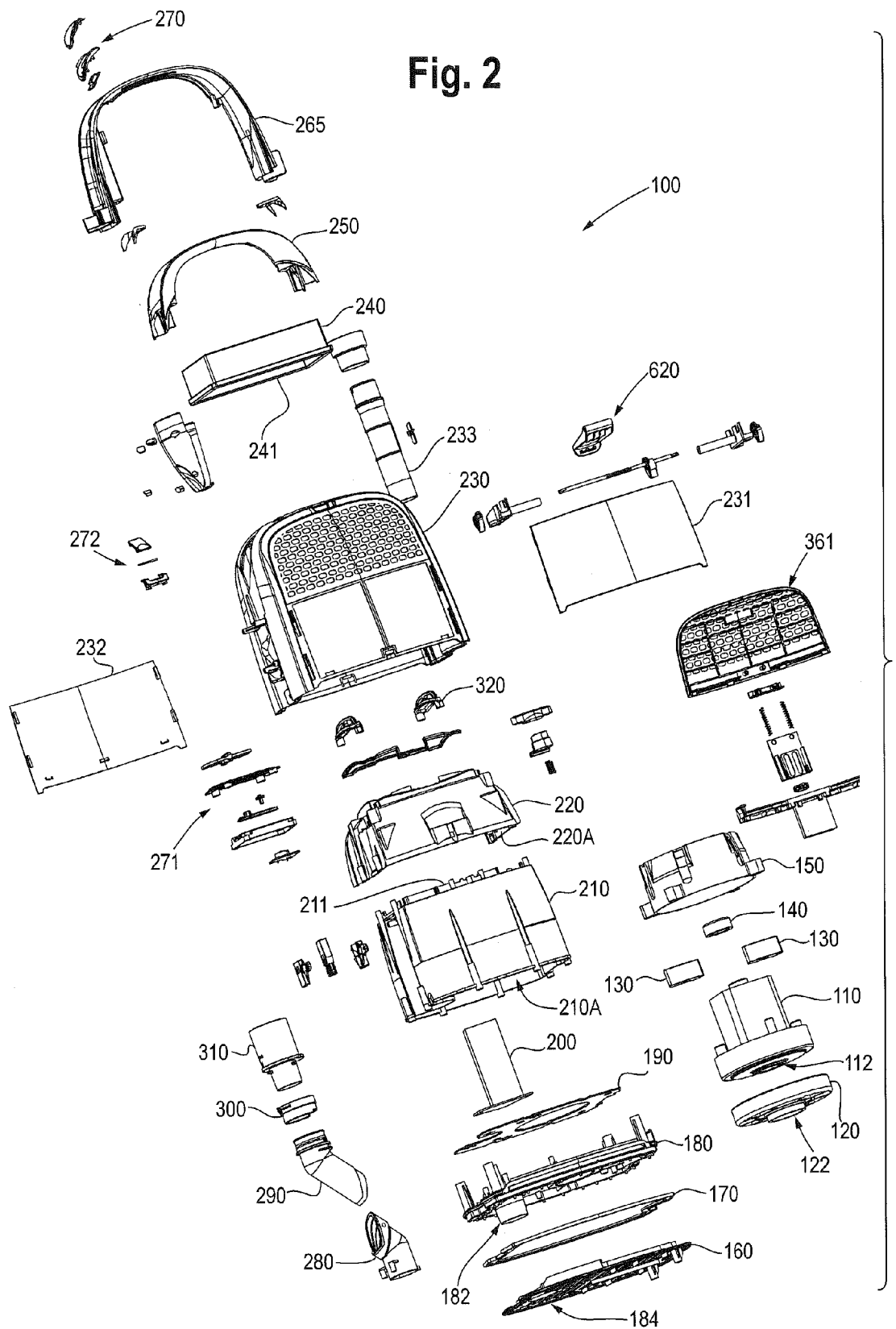
FIG. 2 is an exploded front profile view of the top half of a canister vacuum in accordance with an embodiment.
Figure 3:
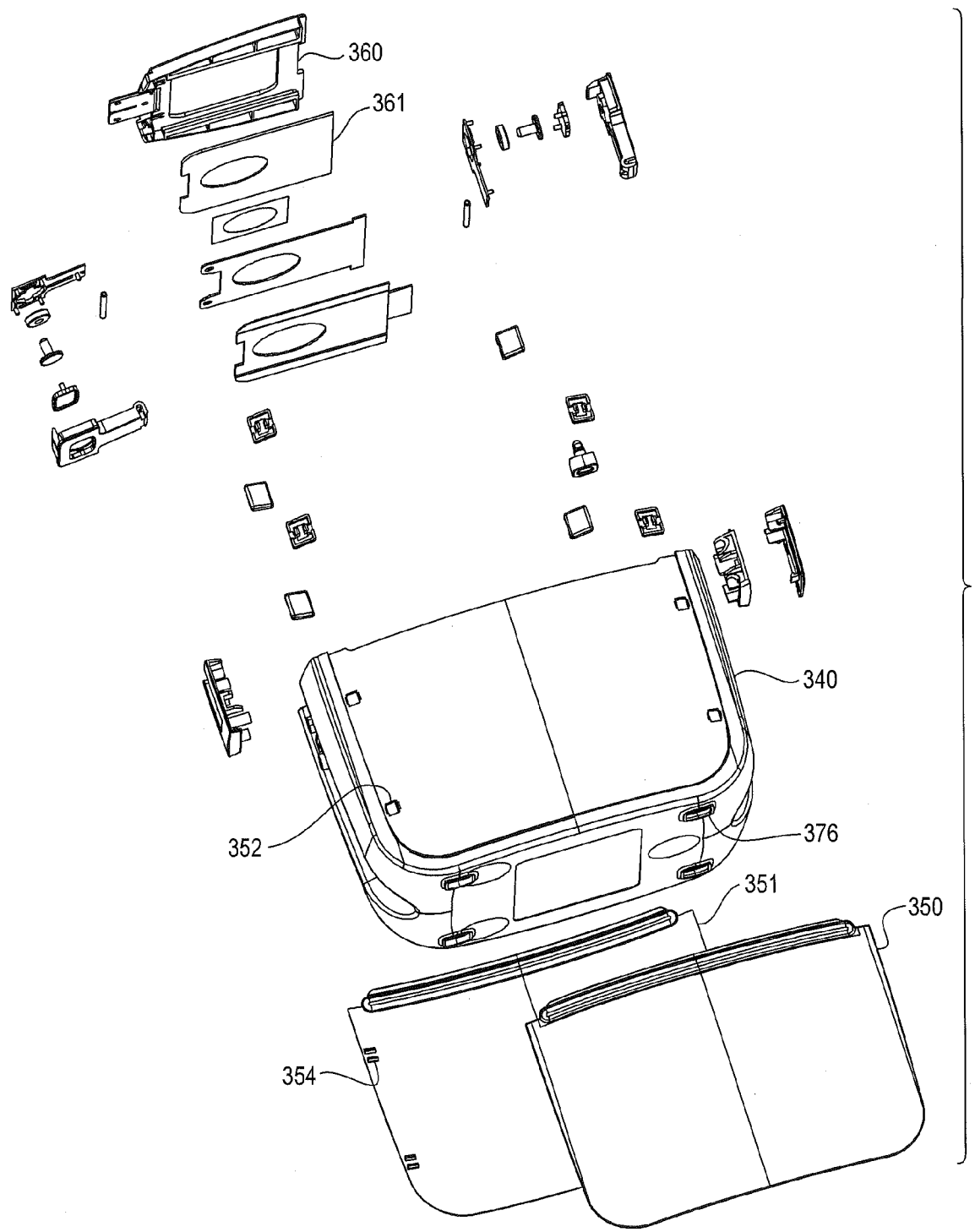
FIG. 3 is an exploded front profile view of the bottom half of a canister vacuum in accordance with an embodiment.

FIGS. 2-3 together show an exploded front profile view of an embodiment of the canister vacuum 100 of the invention. The canister 100 can include handle 250, hose mount 265, and power switch 270. Power switch 270 can be disposed below handle 250 so as to avoid an accidental turning off or on of vacuum 100. An outer shell 230 can include a latch 272 that allows hinged upper housing door 361 to open. Open door 361 allows access to upper section 103 and compartment 240.

In one embodiment, the canister vacuum cleaner 100 includes an upper housing 220 including an interior region, a central housing 210 including an interior region, and a lower housing 340, 350, 351 including an interior region. The embodiment includes an inner wall 180 that separates the interior region of the central housing 210 from the interior region of the lower housing 340, 350, 351, a first grill 160 that separates the inner wall 180 from the lower housing 340, 350, 351 and prevents the passage of large debris particles, and a second grill 211 separates the interior region of the central housing 210 from the interior region of the upper housing 220.

The embodiments can include an air intake conduit 280 including an air intake opening disposed through a first side of the central section 102 to receive intake air, and an outflow opening disposed through the inner wall 180 and first grill 160 that directs the intake air to the lower housing 340, 350, 351 in a first axial direction. The embodiments can include an air cleaning device 370, such as a vacuum cleaner bag, disposed within the lower housing 340, 350, 351 that removes dirt particles from the air to produce cleaned air.

In various embodiments a air propulsion device 110 including an airflow propulsion device, such as a fan, can be mounted in the central housing 220 that draws cleaned air from the lower housing 340, 350, 351 and directs it through the first grill 160, into the central housing 210, through the second grill 211, and into the upper housing 220 in a second axial direction (e.g. 570, 580) opposite to the first axial direction (e.g., 540, 550). An exhaust opening can be disposed through the upper housing 220 that leads to the interior region of the upper housing 220 and allows cleaned air to exit the interior region of the upper housing 220 in a direction perpendicular (e.g., 360) to the first and second axial directions (e.g., 540, 550, 570, 580).

Further embodiments can include a top fascia 230 mounted to the upper and central housings 220, 210. A bottom fascia can be mounted to the lower housing 340, 350, 351 and a handle 250, 265 can be mounted to the top fascia 230. An air cleaning device 370, such as a vacuum bag, can be disposed within the lower housing 340, 350, 351 that removes dirt particles from the air to produce cleaned air.

An airflow propulsion device 110 including a motor and a fan can be mounted in the central housing 210 that draws cleaned air from the lower housing 340, 350, 351 through a first grill 180, into the central housing 210, through the second grill 211, and into the upper housing 220 in a second axial direction opposite to the first axial direction. An exhaust 235 disposed through the upper housing 220 and leading to the interior region of the upper housing 220 allows cleaned air to exit the interior region of the upper housing 220 in a direction perpendicular 630 to the first and second axial directions.

In various embodiments, foam can encase portions of the air propulsion device 110 and a bell housing 150 can be mounted over the air propulsion device 110 to dampen noise.

Vibration and noise dampeners can be used, including a rubber bushing 140 secured to the top of the air propulsion device 110, a rubber boot 120 secured to the bottom of the air propulsion device 110, rubber mounting brackets 130 disposed between the air propulsion device 110 and the bell housing 150, a sealant 362 disposed around the perimeter of the upper compartment door opening, a sealant 241 disposed around the bottom surface perimeter of the filter compartment, and a rubber gasket 170, 190 disposed on either side of inner wall 180. The sealants and gaskets can form a sealed vacuum such that air only enters the vacuum through air intake conduit 280 and air only exits the vacuum through exhaust 235.

In various embodiments the vacuum 100 is a compact, high powered, quiet vacuum that can provide power to the air up to 160, 180, 200, 220, or 240 air watts, and up to 80, 90, 100, 110, or 120 inches of field suction, which is double the lift of a conventional handheld canister vacuum. Due to the advanced noise and vibration dampening features, the vacuum 100 can also be quiet such that it produces less than 85 decibels (dB) when operating.

At the same time, the vacuum can be lightweight such that in certain embodiments the vacuum can weigh eight pounds or less without the power cord. To reduce the weight of the vacuum 100, boot 120 and bell housing 150 can include holes to reduce weight.

The vacuum can also be compact such that the total interior volume of the canister vacuum cleaner is less than 675 cubic inches, the volume of the lower housing is less than 270 cubic inches, the volume of the central housing is less than 225 cubic inches, and the volume of the lower housing is 270 cubic inches.

In another embodiment, air is cleaned using a canister vacuum cleaner 100 by directing intake air through an intake opening and conduit 280 in a central section 102 of a canister vacuum cleaner 100 in a first axial direction 540 and into a cleaning device 370 disposed in a lower housing 340, 350, 351 of the canister vacuum cleaner 100, cleaning the intake air by directing the intake air through the cleaning device 370 and trapping dirt particles inside the cleaning device 370, expelling clean air outside the cleaning device and into the lower housing 340, 350, 351, operating an air propulsion device 110 that draws cleaned air from the lower housing 340, 350, 351 in a second axial direction 570, 580 opposite from the first axial direction, directing the cleaned air through the central housing 210 and into the upper housing 220, and expelling the cleaned air from the upper housing 210 in a direction perpendicular 630 to the first and second axial directions 540, 580.

In various other embodiments, cleaned air passes through a filter 242 in the upper housing 220 and cleaned air that enters the upper housing 220 in a second axial direction 600 opposite from the first axial direction 540 is redirected into the first axial direction 620 prior to being expelled from the upper housing 220.

Figure 4:
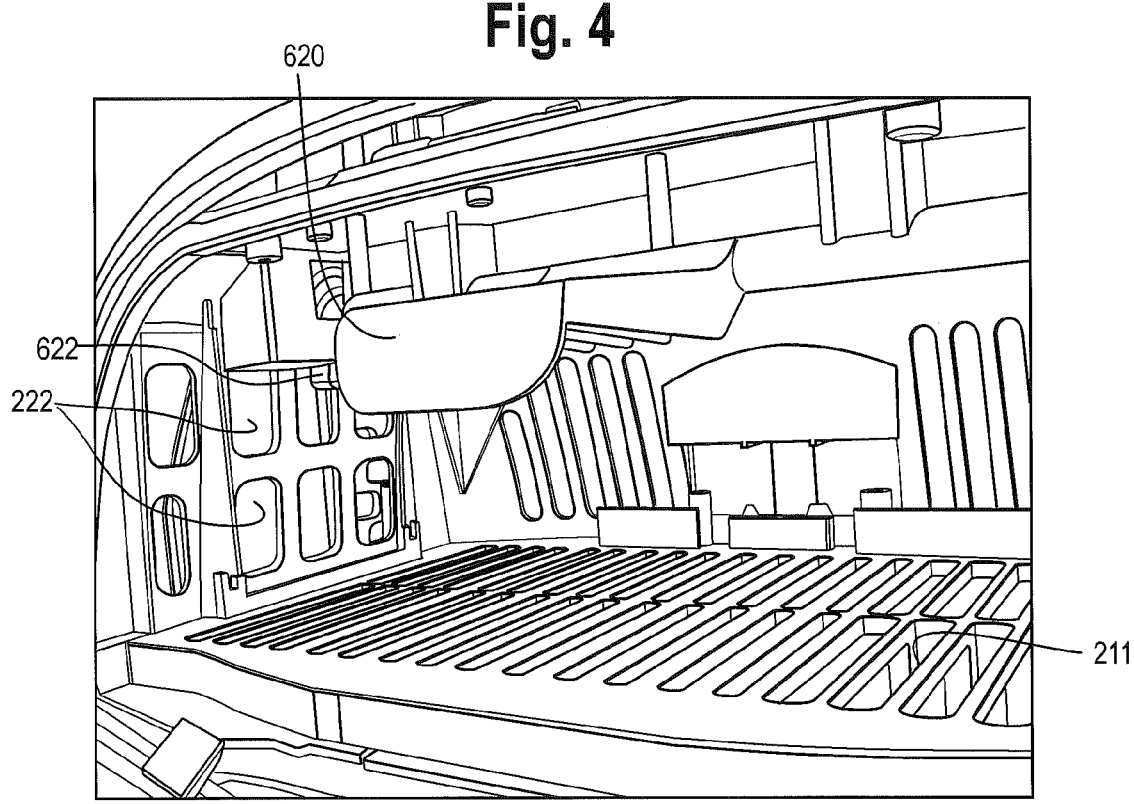
FIG. 4 illustrates an upper housing and an exhaust opening in accordance with an embodiment.
Figure 5:
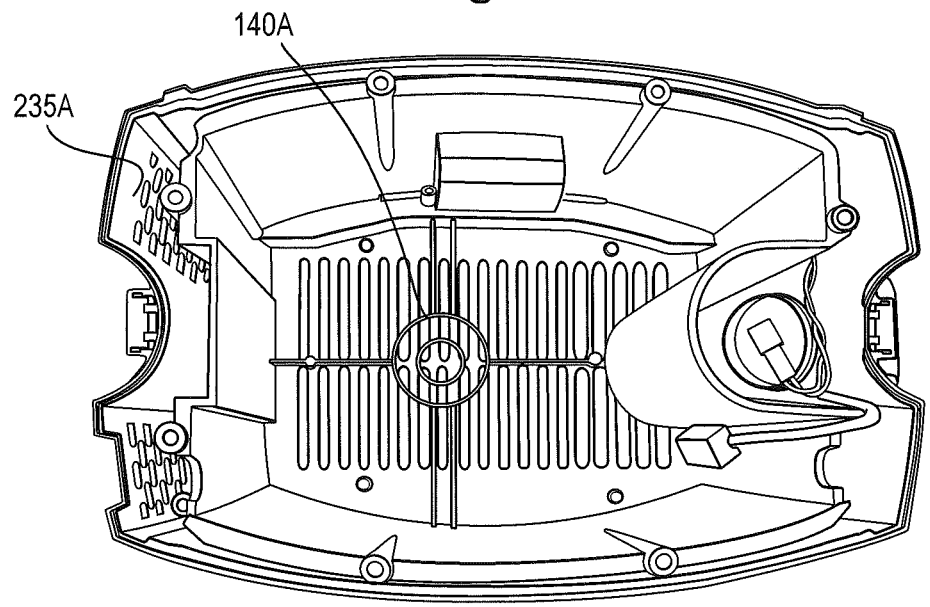
FIG. 5 illustrates a central housing will a grill disposed between the central housing and an upper housing.

As shown in FIG. 4, a latch 620 can be disposed in the upper housing. Latch 620 can removably hold a filter or a battery. Operation of latch 620 can turn a cam 622, so that cam 622 pushes down on a top surface of filter 240. This forms a better seal between filter 240 and grill 211. This ensures that more of the airflow is filtered by filter 242 prior to the airflow being exhausted. The upper housing can include an exhaust opening 620. Exhaust opening 620 can allow an airflow to exit to a diffuser region 235A as seen in FIG. 5. Diffuser region 235A can provide a large area for the exhaust airflow to exit. The large area and a plurality of openings in diffuser region 235A can allow the airflow to exit the vacuum at a lower speed. This can reduce airflow noise. A filter (not shown) can be disposed in diffuser region 235A, for example, when a battery is disposed in the DC version of a portable vacuum cleaner.

Figure 9:
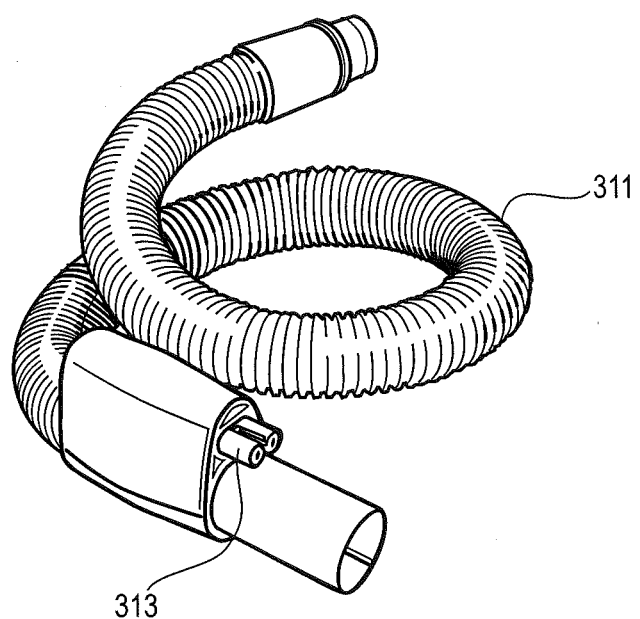
FIG. 9 illustrates an embodiment of a powered hose.
Figure 9A:
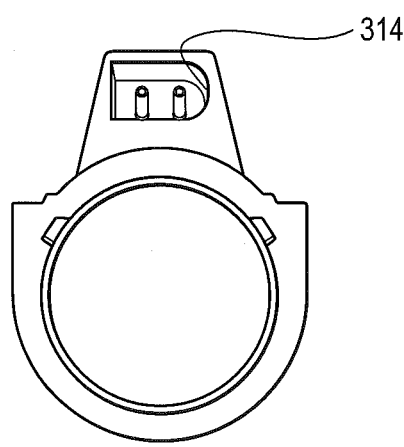
FIG. 9A illustrates an embodiment of a powered hose end.
Figure 10:
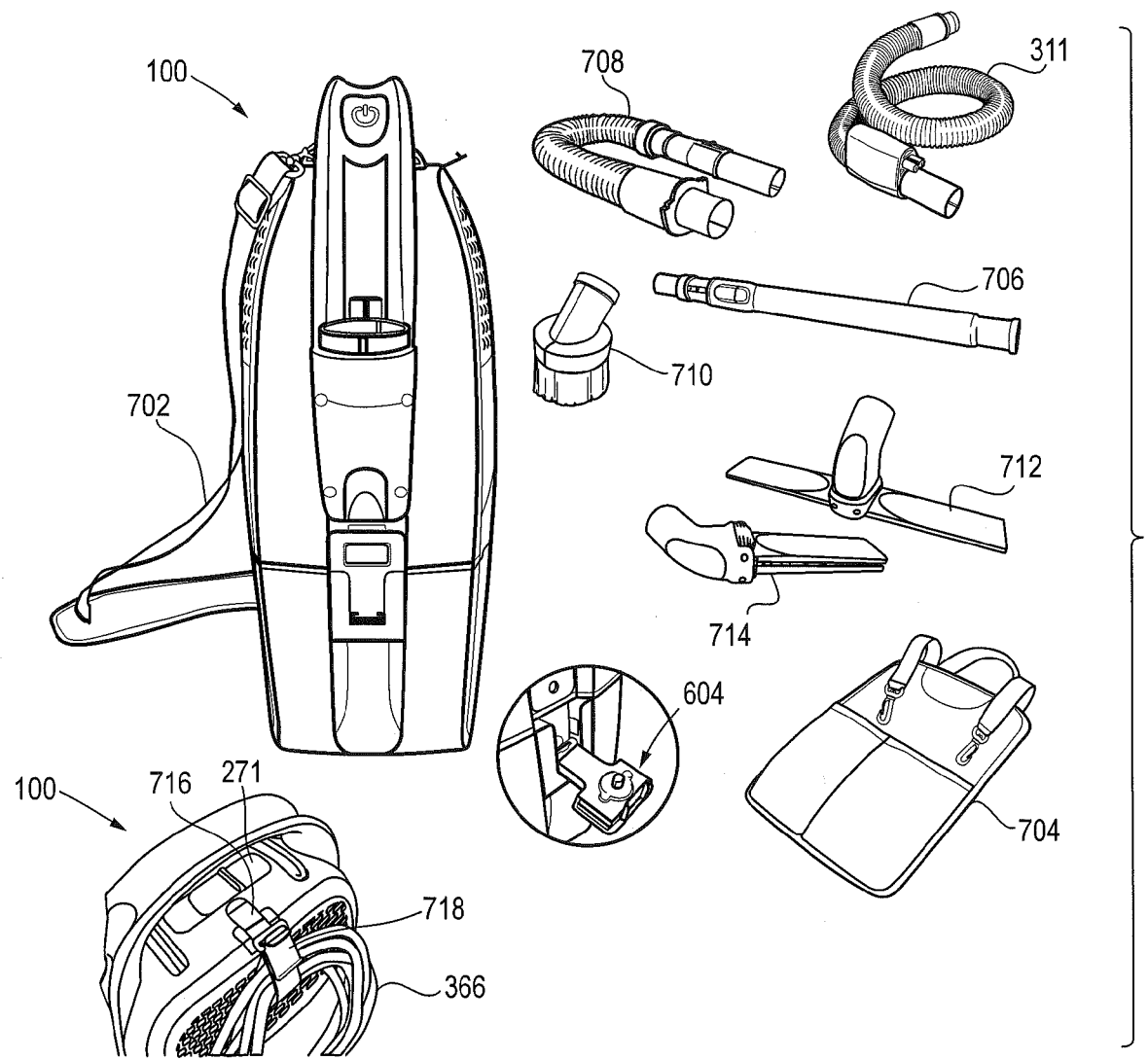
FIG. 10 illustrates a plurality of option devices usable with the vacuum.

As depicted in FIG. 10, various embodiments of vacuum 100 can include attachment loops 320 to which a user can attach a shoulder strap 702 and tool caddy attachment 704. The tool caddy can include various cleaning attachments, such as an extension wand 706, dusting brush 710, crevice tool 714, and upholstery brush 712, that can attach to powered hose 311 or non-powered hose 708. Power cord 366 can be stored using cord strap 718 and cord strap release button 716. The vacuum can also include a variable speed switch 271 that a user can slide to adjust the suction power of the vacuum and a power cord 366. The powered hose 311 can include an electrical receptacle 313 at one end. The powered host 311 can include an electrical receptacle 314 (see FIG. 9A) at one end opposite the electrical receptacle 313. The two electrical receptacles 313, 315 can be complementary in shape, e.g., one can receive the other.

The detailed descriptions of the above embodiments are not exhaustive descriptions of all embodiments contemplated by the inventors to be within the scope of the invention. Indeed, persons skilled in the art will recognize that certain elements of the above-described embodiments can variously be combined or eliminated to create further embodiments, and such further embodiments fall within the scope and teachings of the invention. It will also be apparent to those of ordinary skill in the art that the above-described embodiments can be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vacuum devices and not just to the embodiments described above and shown in the accompanying figures. Accordingly, the scope of the invention should be determined from the following claims.

We claim:

1. A canister vacuum cleaner comprising:
   an upper housing including an interior region;
   a central housing including an interior region;
   a lower housing including an interior region adapted to receive a dirt capture device to trap particulates;
   an inner wall that separates the interior region of the central housing from the interior region of the lower housing;
   a grill that separates the interior region of the central housing from the interior region of the upper housing;
   an air intake conduit disposed through the inner wall that directs an intake airflow to the lower housing in a first axial direction;
   an airflow propulsion device mounted in the central housing to propel the airflow from the lower housing into the central housing through an opening in the inner wall in a second axial direction opposite to the first axial direction; and
   an exhaust opening disposed in the upper housing to allow the airflow to exit the interior region of the upper housing.

2. The vacuum of claim 1 wherein the exhaust direction is substantially perpendicular to the first and second axial directions.

3. The vacuum of claim 1 further comprising a fascia mounted to one or more of the upper, central or lower housing.

4. The vacuum of claim 1 further comprising a handle disposed on the upper housing.

5. The vacuum of claim 1 further comprising a grill disposed over the opening to prevent a passage of large debris particles.

6. The vacuum of claim 1 further comprising noise dampeners disposed around the airflow propulsion device comprising foam encasing portions of the motor and a bell housing mounted over the foam-encased motor.

7. The vacuum of claim 6 further comprising a rubber mounting bracket disposed between the motor and the bell housing.

8. The vacuum of claim 1 further comprising vibration dampeners disposed around the airflow propulsion device comprising a rubber bushing secured to the top of the airflow propulsion device and a rubber boot secured to the bottom of the airflow propulsion device.

9. The vacuum of claim 1 further comprising:
a sealant disposed around the perimeter of the upper compartment door opening;
a sealant disposed around the bottom surface perimeter of the filter compartment; and
a rubber gasket disposed on both sides of the inner wall.

10. The vacuum of claim 1 wherein the upper, central and lower housings are sealed together such that air substantially enters the vacuum through the air intake conduit and air substantially exits the vacuum through the exhaust opening.

11. The vacuum of claim 1 wherein the vacuum provides power to the air of at least 100 air watts.

12. The vacuum of claim 1 wherein the vacuum provides at least 90 inches of field suction.

13. The vacuum of claim 1 wherein the volume of the lower housing is less than 270 cubic inches, the volume of the central housing is less than 225 cubic inches, and the volume of the lower housing is 270 cubic inches.

14. The vacuum of claim 1, further comprising a HEPA filter disposed in the upper housing between the exhaust opening and the grill.

15. The vacuum of claim 1, further comprising a further compromising a battery disposed in the upper housing.

16. A method of cleaning air using a canister vacuum cleaner comprising:
directing intake air along a first axial direction through into a vacuum bag disposed in a first housing;
trapping dirt particles inside the vacuum bag;
drawing air from the first housing into a second housing in a second axial direction opposite from the first axial direction;
directing the air through the second housing and into a third housing; and
expelling the cleaned air from the third housing in a direction perpendicular to the first and second axial directions.

17. The method of claim 16 wherein prior to be expelled, the air passes through a filter disposed in the third housing.

18. The method of claim 16 wherein the air that enters the third housing is redirected into the first axial direction prior to being expelled from the third housing.

19. The method of claim 16 sound proofing the second housing so that a motor operating at a 800 mean Watts power produces less than about 85 decibels of noise.

* * * * *